United States Patent
Benson et al.

(10) Patent No.: US 6,620,485 B1
(45) Date of Patent: *Sep. 16, 2003

(54) STABLE WEB HAVING ENHANCED EXTENSIBILITY AND METHOD FOR MAKING THE SAME

(75) Inventors: Douglas Herrin Benson, West Harrison, IN (US); John Joseph Curro, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 08/916,055

(22) Filed: Aug. 21, 1997

(51) Int. Cl.$^7$ ................................................. B32B 3/28
(52) U.S. Cl. ........................ 428/156; 428/152; 428/153; 428/154; 428/349; 428/354; 428/903; 604/358; 604/378; 604/385.1
(58) Field of Search ............................... 428/152, 153, 428/154, 156, 903, 349, 354; 604/358, 378, 385.1

(56) References Cited

U.S. PATENT DOCUMENTS

| | | | |
|---|---|---|---|
| 4,041,951 A | | 8/1977 | Sanford ..................... 128/287 |
| 4,127,637 A | * | 11/1978 | Pietreniak ................... 428/152 |
| 4,153,664 A | * | 5/1979 | Sabee ......................... 264/289 |
| 4,720,415 A | | 1/1988 | Vander Wielen et al. ... 428/152 |
| 4,965,122 A | * | 10/1990 | Morman ..................... 428/225 |
| 4,981,747 A | | 1/1991 | Morman ..................... 428/198 |
| 5,198,057 A | | 3/1993 | Newkirk et al. .............. 156/83 |
| 5,226,992 A | * | 7/1993 | Morman ..................... 156/62.4 |
| 5,244,482 A | * | 9/1993 | Hassenboehler, Jr. ........ 55/528 |
| 5,336,457 A | | 8/1994 | Wu et al. .................... 264/171 |
| 5,691,035 A | * | 11/1997 | Chappell et al. ............. 428/152 |
| 5,914,084 A | * | 6/1999 | Benson et al. .............. 264/284 |

FOREIGN PATENT DOCUMENTS

| | | |
|---|---|---|
| EP | 0 301 810 A2 | 2/1989 |
| GB | 1 211 602 | 11/1968 |

* cited by examiner

Primary Examiner—Nasser Ahmad
(74) Attorney, Agent, or Firm—Douglas W. McArthur; Ian S. Robinsox; Roddy M. Bullock

(57) ABSTRACT

The present invention provides a stable material having enhanced extensibility and a method for making the same. A tensioning force is applied to a neckable material to neck the material. The necked material is then subjected to mechanical stabilization to provide a stabilized extensible necked material. The stabilized extensible necked material is easily extended in a direction parallel to the direction necking.

1 Claim, 4 Drawing Sheets

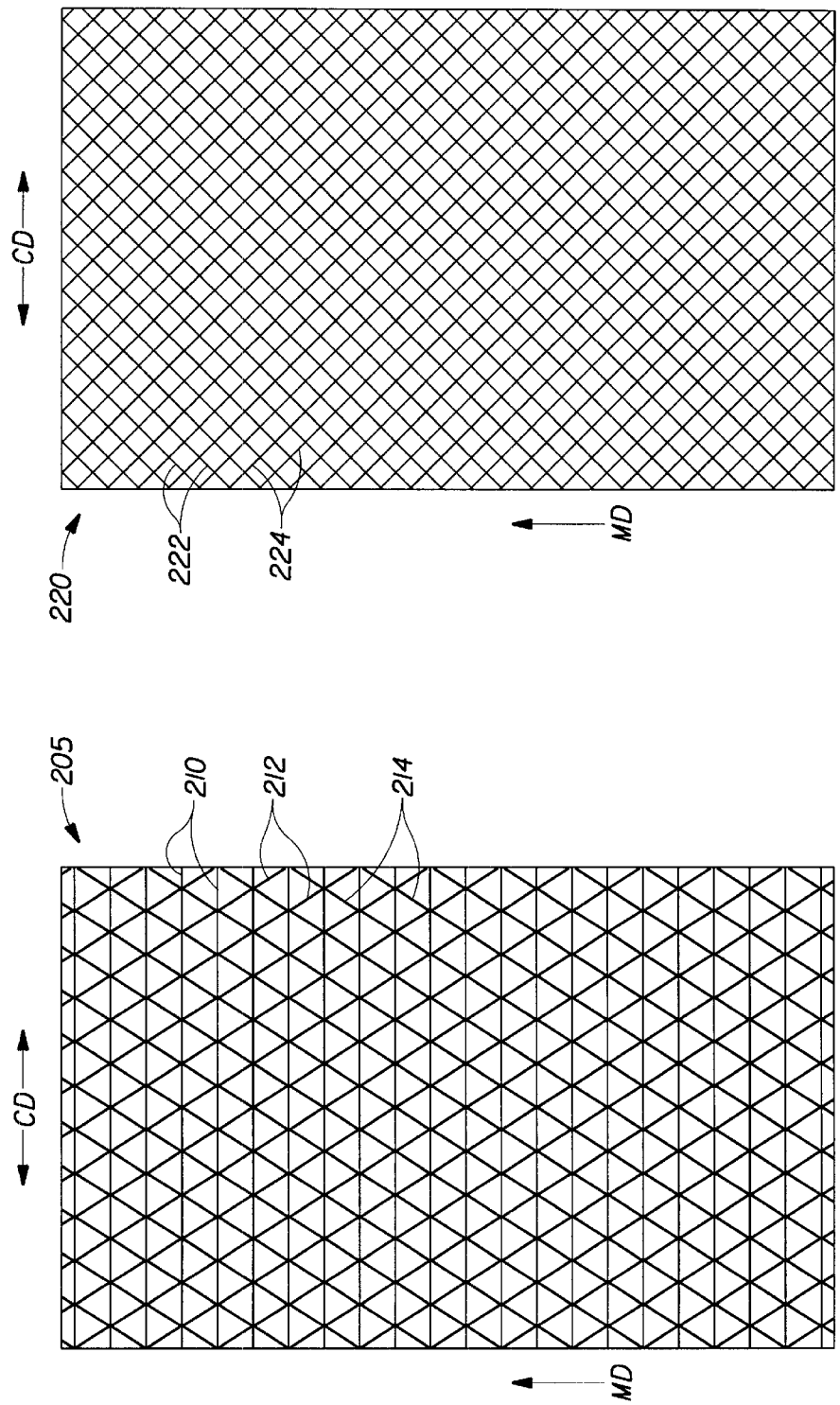

STABLE WEB HAVING ENHANCED EXTENSIBILITY AND METHOD FOR MAKING THE SAME

FIELD OF THE INVENTION

The present invention relates to stable materials having enhanced extensibility and a mechanical post-processing method for making the same. High extension materials, such as nonwoven webs and film webs are particularly well suited for use in disposable absorbent articles such as diapers, incontinence briefs, training pants, feminine hygiene garments, and the like, as they are able to be used in portions of the article where high extensibility can aid in the article's fit to the body.

BACKGROUND OF THE INVENTION

Nonwoven webs may be manufactured into products and components of products so inexpensively that the product may be viewed as disposable after only one or a few uses. Representatives of such products include diapers, training pants, wipes, garments, incontinence briefs, feminine hygiene garments and the like.

Nonwoven webs may be treated to provide the nonwoven web with certain properties. For example, U.S. Pat. No. 5,244,482 issued to Hassenboehler, Jr. et al. on Sep. 14, 1993 discloses a method for treating a nonwoven web wherein the nonwoven web is heated at an elevated temperature and uniaxially drawn to consolidate and stabilize the nonwoven web. Such nonwoven webs are noted to exhibit an increased elasticity after processing. Such elasticity increase is recognized as being caused by the new "memory" instilled by the heating of the nonwoven web. For applications desiring enhanced extensibility rather than elasticity, such heating is therefore not desirable. Additionally, such drawing and setting of the nonwoven web by heating at an elevated temperature often causes fiber embrittlement and the nonwoven web to exhibit increased gloss. For many applications involving skin contact, e.g., such as in diaper coverstock, such attributes are contrary to the desired cloth-like properties of softness and non-plastic, (low gloss) appearance. Lastly, the requirement of heating the nonwoven web to consolidate and stabilize the web adds to the complexity and cost of the process.

U.S. Pat. No. 4,981,747 issued to Morman on Jan. 1, 1991, discloses a "reversibly necked" material. It is taught that the unstabilized necked material must be held under high tension on the re-wound roll until such time as the further heat setting step is performed to stabilize the material. Such a material will again suffer the deficits noted above with respect to preferred skin contact applications, and will enhance the elastic properties of the material rather than the extensible behavior of the material.

U.S. Pat. No. 5,226,992 issued to Morman on Jul. 13, 1993, discloses a method of producing a composite elastic necked-bonded material. A tensioning force is applied to at least one neckable material, such as a neckable nonwoven web, to neck or consolidate the material. Instead of heating the consolidated nonwoven web, this patent teaches superposing the tensioned consolidated nonwoven web on an elastic material and joining the tensioned consolidated nonwoven web to the elastic material while the tensioned consolidated nonwoven web is in a tensioned condition. By joining the tensioned consolidated nonwoven web to the elastic material while still in a tensioned condition, the nonwoven web is constrained to its necked dimension. Such a procedure does not provide a means for producing a stabilized extensible web without the attachment of the nonwoven web to an additional elastic layer.

It is an object of the present invention to provide a stabilized extensible necked nonwoven web, capable of being wound into stable rollstock or festooned form, suitable for subsequent conversion or combining operations.

It is also an object of the present invention to provide a stabilized extensible necked nonwoven web, capable of very high speed extension via mechanical straining means.

It is also an object of the present invention to provide a post-processing method for producing a stabilized extensible necked nonwoven web.

It is also an object of the present invention to provide a post-processing method for producing a stabilized extensible necked nonwoven web that does not require heating of the neckable material to elevated temperatures, to enhance the extensible properties rather than the elastic properties and to substantially preserve the original properties of the neckable nonwoven web.

As used herein, the term "elastic", refers to any material which, upon application of a biasing force, is stretchable, that is, elongatable, to at least about 60 percent (i.e., to a stretched, biased length which is at least about 160 percent of its relaxed unbiased length), and which, will recover at least 55 percent of its elongation upon release of the stretching, elongation force.

As used herein, the term "extensible" refers to any material which, upon application of a biasing force, is stretchable, that is, elongatable, to at least about 60 percent without suffering catastrophic failure (i.e., to a stretched, biased length which is at least about 160 percent of its relaxed unbiased length), but does not recover more than 55 percent of its elongation upon release of the stretching, elongation force.

As used herein, the term "highly extensible" refers to any material which, upon application of a biasing force, is stretchable, that is, elongatable, to at least about 100 percent without suffering catastrophic failure (i.e., to a stretched, biased length which is at least about 200 percent of its relaxed unbiased length), but does not recover more than 55 percent of its elongation upon release of the stretching, elongation force.

As used herein, the term "stabilized" refers to a material of the present invention which is capable of being stored in a stable condition in any common or conventional web storage manner without the need for further heating or the addition of or joinder with other webs to stabilize the material. Such storage means would include for example, low tension rolls or festooned material in boxes.

As used herein, the term "nonwoven web", refers to a web that has a structure of individual fibers or threads which are interlaid, but not in any regular repeating manner. Nonwoven webs have been, in the past, formed by a variety of processes such as, for example, meltblowing processes, spunbonding process, and bonded carded web processes.

As used herein, the term "necked material", refers to any material which has been constricted in at least one dimension by applying a tensioning force in a direction that is perpendicular to the desired direction of neck-down.

As used herein, the term "neckable material", refers to any material which can be necked.

As used herein, the term "percent neckdown", refers to the ratio determined by measuring the difference between the un-necked dimension and the stabilized necked dimensions of the neckable material in the direction of necking, and then dividing that difference by the un-necked dimension of the neckable material, then multiplying by 100.

As used herein, the term "composite elastic material", refers to a material comprising an elastic member joined to a stabilized extensible necked material. The elastic member may be joined to the stabilized extensible necked material at intermittent points or may be continuously bonded thereto. The joining is accomplished while the elastic member and the stabilized extensible necked material are in juxtaposed configuration. The composite elastic material is elastic in a direction generally parallel to the direction of neckdown of the stabilized extensible necked material and may be stretched in that direction to the breaking point of the stabilized extensible necked material. A composite elastic material may include more than two layers.

As used herein, the term "polymer", generally includes, but is not limited to, homopolymers, copolymers, such as, for example, block, graft, random, and alternating copolymers, terpolymers, etc. and blends and modifications thereof. Furthermore, unless otherwise specifically limited, the term "polymer" shall include all possible molecular geometric configurations of the material. These configurations include, but are not limited to, isotactic, syndiotactic and random symmetries.

SUMMARY OF THE INVENTION

In accordance with the present invention there is provided a method of producing a stabilized extensible necked material comprising the steps of:

providing a neckable material;

applying a tensioning force to the neckable material to neck the material; and subjecting the necked material to mechanical stabilization to provide a stabilized extensible necked material. The stabilized extensible necked material is easily extended in a direction parallel to the direction of necking. A preferred method for mechanically stabilizing the necked material comprises subjecting the necked material to incremental stretching in a direction generally perpendicular to the necked direction.

The method may also comprise the additional step of winding the stabilized extensible necked material onto a take-up roll or festooning the stabilized extensible necked material into box.

The method may also comprise the additional step of joining the stabilized extensible necked material to an elastic member to form a composite elastic material.

If the material is stretchable it may be necked by stretching in a direction generally perpendicular to the desired direction of neck-down. The neckable material may be any material that can be necked sufficiently at room temperature. Such neckable materials include knitted and loosely woven fabrics, bonded carded nonwoven webs, spunbonded nonwoven webs, or meltblown nonwoven webs. The neckable material may also have multiple layers such as, for example, multiple spunbonded layers and/or multiple meltblown layers or film layers. The neckable material may be made of polymers such as for example, polyolefins. Exemplary polyolefins include polypropylene, polyethylene, ethylene copolymers, propylene copolymers and blends thereof. The neckable material may be a nonelastic material such as for example a nonelastic nonwoven material.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

FIG. 8 is a plan view of an embossment pattern of the present invention which is suitable for setting the necked material; and FIG. 9 is a plan view of another embossment pattern of the present invention which is suitable for setting the necked material.

DETAILED DESCRIPTION OF THE INVENTION

Figure 1:
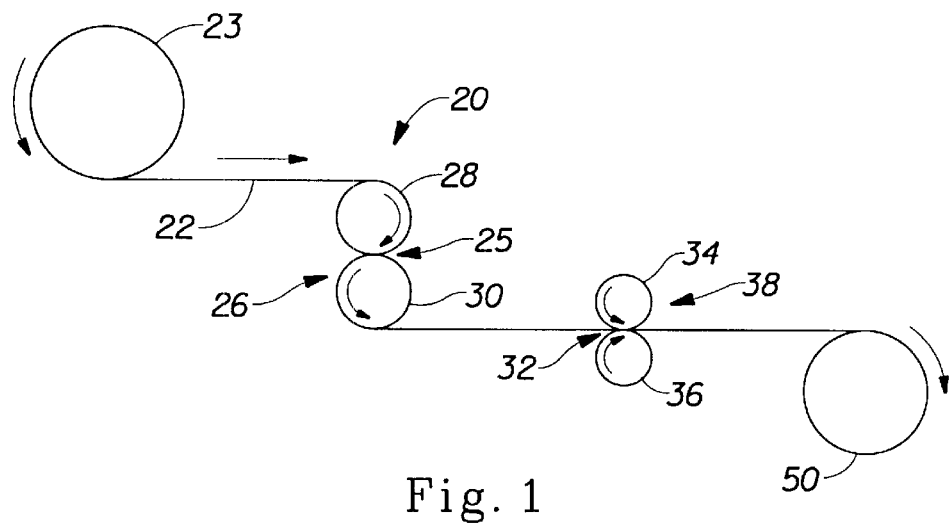
FIG. 1 is schematic illustration of an exemplary process for forming a necked material of the present invention.

Referring to FIG. 1 there is schematically illustrated at 20 a process for forming a stabilized extensible necked material of the present invention.

According to the present invention, a neckable material 22 is unwound from a supply roll 23 and travels in the direction indicated by the arrows associated therewith as the supply roll 23 rotates in the direction indicated by the arrows associated therewith. The neckable material 22 passes through a nip 25 of the S-roll arrangement 26 formed by the stack rollers 28 and 30.

The neckable material 22 may be formed by known nonwoven extrusion processes, such as, for example, known meltblowing processes or known spunbonding processes, and passed directly through the nip 25 without first being stored on a supply roll.

The neckable material 22 passes through the nip 25 of the S-roll arrangement 26 in a reverse-S path as indicated by the rotation direction arrows associated with the stack rollers 28 and 30. From the S-roll arrangement 26 the neckable material 22 passes through the nip 32 formed by the incremental stretching rollers 34 and 36 of the mechanical stabilization arrangement 38. Because the peripheral linear speed of the rollers of the S-roll arrangement 26 is controlled to be less than the peripheral linear speed of the rollers of the mechanical stabilization arrangement 38, the neckable material 22 is tensioned between the S-roll arrangement 26 and the nip 32 of the incremental stretching rollers 34 and 36 of the mechanical stabilization arrangement 38. By adjusting the difference in the speeds of the rollers, the neckable material 22 is tensioned so that it necks a desired amount and is maintained in such a tensioned, necked condition. The mechanical stabilization arrangement 38 provides a stabilized necked material which may be joined to other materials.

Other methods of tensioning the neckable material 22 may be used such as, for example, tenter frames or other cross-machine direction stretcher arrangements that expand the neckable material 22 in other directions such as, for example, the cross-machine direction.

The neckable material 22 may be extensible, elastic, or nonelastic nonwoven material. The neckable material 22 may be a spunbonded web, a meltblown web, or a bonded carded web. If the neckable material is a web of meltblown fibers, it may include meltblown microfibers. The neckable material 22 may be made of fiber forming polymers such as, for example, polyolefins. Exemplary polyolefins include one or more of polypropylene, polyethylene, ethylene copolymers, propylene copolymers, and butene copolymers.

In one embodiment of the present invention, the neckable material 22 may be a multilayer material having, for example, at least one layer of a spunbonded web joined to at least one layer of a meltblown web, a bonded carded web or other suitable material. Alternatively, the neckable material 22 may be a single layer of material such as, for example, a spunbonded web, a meltblown web, or a bonded carded web.

The neckable material 22 may also be a composite material made of a mixture of two or more different fibers or a mixture of fibers and particles. Such mixtures may be formed by adding fibers and/or particulates to the gas stream in which the meltblown fibers are carried so that an intimate entangled commingling of meltblown fibers and other materials, e.g., wood pulp, staple fibers and particulates such as, for example, hydrocolloidal (hydrogel) particles commonly referred to as superabsorbent materials, occurs prior to collection of the meltblown fibers upon a collecting device to form a coherent web of randomly dispersed meltblown fibers and other materials.

The nonwoven web of fibers should be joined by bonding to form a coherent web structure which is able to withstand necking. Suitable bonding techniques include, but are not limited to, chemical bonding, thermobonding, such as point calendering, hydroentangling, and needling.

Figure 2:
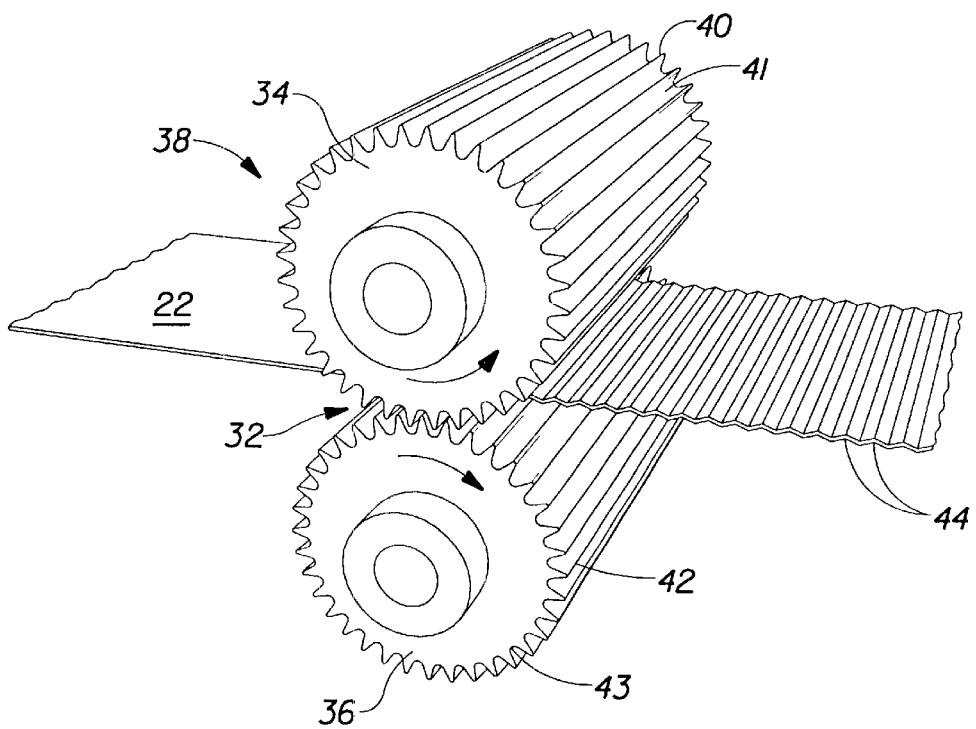
FIG. 2 is an enlarged perspective illustration of the stabilizing roller arrangement.

FIG. 2 is an enlarged perspective illustration of a preferred embodiment of the mechanical stabilization arrangement 38 employing opposed pressure applicators having three-dimensional surfaces which at least to a degree are complimentary to one another. The mechanical stabilization arrangement 38 shown in FIG. 2 comprises incremental stretching rollers 34 and 36. The neckable material 22 passes through the nip 32 formed by incremental stretching rollers 34 and 36 as the incremental stretching rollers rotate in the direction indicated by the arrows associated therewith. Uppermost incremental stretching roller 34 comprises a plurality of teeth 40 and corresponding grooves 41 which extend about the entire circumference of roller 34. Lowermost incremental stretching roller 36 comprises a plurality of teeth 42 and corresponding grooves 43 which extend about the entire circumference of roller 36. The teeth 40 on roller 34 intermesh with or engage the grooves 43 on roller 36, while the teeth 42 on roller 36 intermesh with or engage the grooves 41 on roller 34.

The teeth 40 and 42 on rollers 34 and 36, respectively, extend in a direction substantially perpendicular to the travel direction of the neckable web 22 or in a direction substantially parallel to the width of the neckable material 22. That is, teeth 40 and 42 extend in a direction parallel to the cross-machine or CD direction. The incremental stretching rollers 34 and 36 incrementally stretch the necked web in a direction generally perpendicular to the necked direction thereby stabilizing the necked material 22 such that it remains in its necked condition after passing through the incremental stretching rollers 34 and 36 and the tension on the necked material is released. By stabilizing the necked material, the necked material substantially maintains its necked width without returning to its precursor width.

Figure 7:
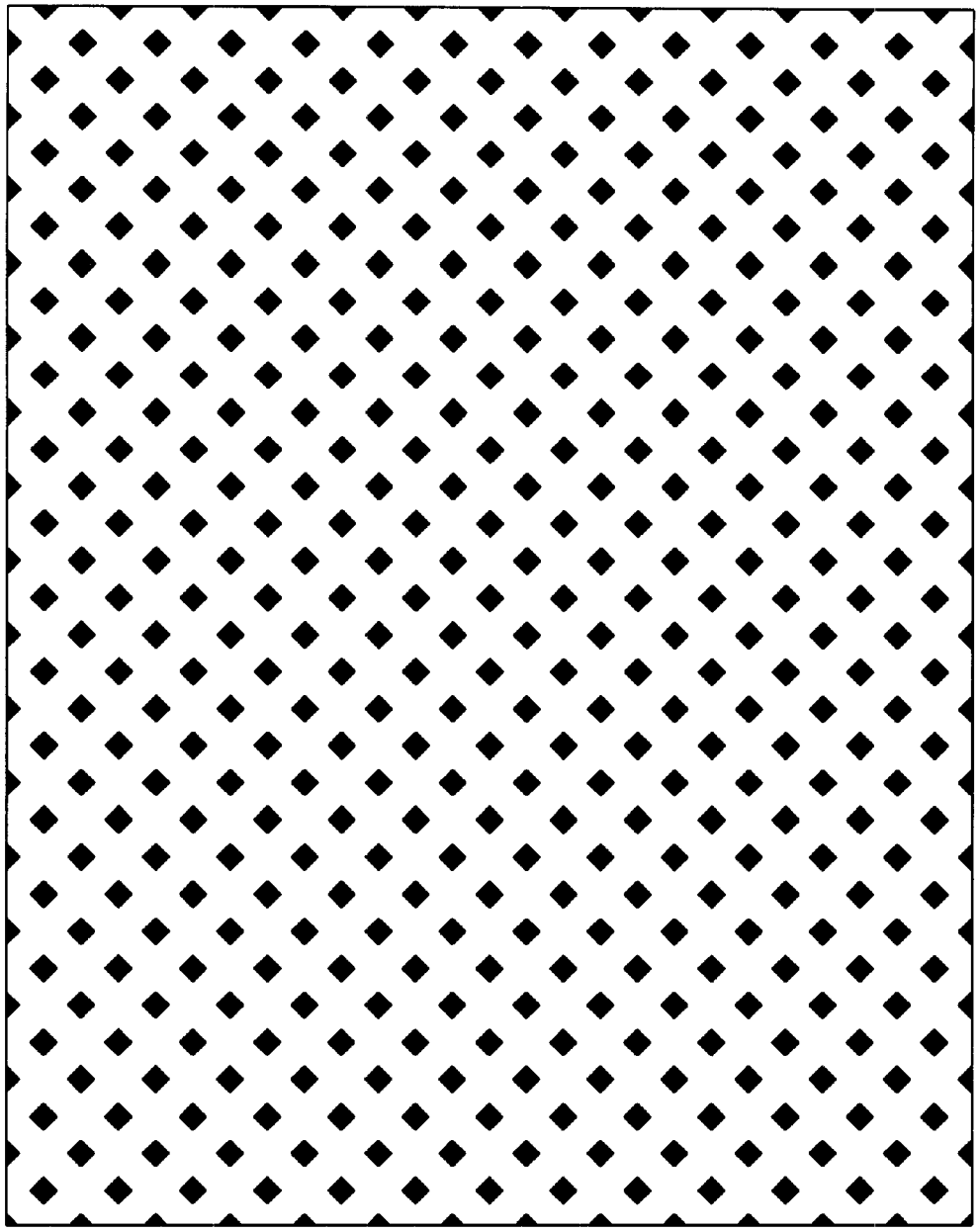
FIG. 7 is a plan view of a spaced-apart pattern of embossments which is not suitable for setting the necked material.

After being stabilized by passing through the incremental stretching rollers 34 and 36, the stabilized necked material 22 includes a plurality of stabilizing embossments 44. Stabilizing embossments 44 extend in a substantially linear direction parallel to one another across the entire width of the stabilized necked material 22. The stabilizing embossments 44 are shown to be extending in a direction substantially parallel to the CD or cross-machine direction. As seen in FIG. 2, each stabilizing embossment extends across the stabilized necked material 22 from one edge to the other edge. This is very important as this sets the fibers across the entire width of the web thereby stabilizing the web. If the stabilizing embossments 44 did not extend entirely across the neckable material 22, the portion of the neckable material that is not embossed would return to its precursor width. For example, a spaced apart pattern of embossments such as shown in FIG. 7, would not effectively set the material. The portions of the material between the individual embossments would not be set, and therefore, would allow the material to return to its precursor width.

The incremental stretching rollers 34 and 36 may include any number of teeth and grooves to provide the desired stabilization in the nonwoven web. In addition, the teeth and grooves may be nonlinear, such as for example, curved, sinusoidal, zig-zag, etc. In addition, the teeth and grooves may extend in a direction other than perpendicular to the travel direction of the neckable web. For example, the teeth and grooves may extend at an angle to the CD direction, but preferably not parallel to the MD or machine direction, as this type of incremental stretching would tend to expand the width of the web, thus defeating the purpose of the necking operation.

Referring now to FIG. 1, after the neckable material 22 passes through the mechanical stabilization arrangement 38 it is wound up on take-up roll 50. Stabilizing the neckable material in its necked condition allows it to be wound up on a take-up roll while in its necked condition and then later used for the desired end use. Once the neckable material has been mechanically stabilized or set, it is suitable for handling on high speed conventional diaper converting equipment without the need for special handling equipment.

The stabilized necked material is easily extended in a direction parallel to the direction of necking. That is, the stabilized necked material is easily extended in the cross-machine direction. The stabilized extensible necked material is elongatable upon application of a biasing force to at least about 60 percent without suffering catastrophic failure, (i.e., to a stretched, biased length which is at least about 160 percent of its relaxed unbiased length). Preferably, the stabilized extensible necked material is elongatable upon application of a biasing force to at least about 100 percent without suffering catastrophic failure, (i.e., to a stretched, biased length which is at least about 200 percent of its relaxed unbiased length). Because the stabilized extensible necked material is extensible and not elastic, the stabilized extensible necked material does not recover more than 55 percent of its elongation upon release of the stretching, elongation force.

The stabilized extensible necked material is preferably elongatable to at least about 60 percent and more preferably to at least about 100 percent or more without suffering catastrophic failure upon the application of a relatively low biasing force. Being elongatable to at least about 60 percent and more preferably to at least about 100 percent or more upon the application of a relatively low biasing force makes the stabilized extensible necked material particularly well suited for use in disposable absorbent articles such as diapers, incontinence briefs, training pants, feminine hygiene garments, and the like, as they are able to be used in portions of the article where high extensibility can aid in the article's fit to the body.

The stabilized extensible necked material is preferably elongatable to at least about 60 percent and more preferably to at least about 100 percent without suffering catastrophic failure upon the application of a biasing force of less than about 100 grams, more preferably upon the application of a biasing force of less than about 200 grams, and most preferably upon the application of a biasing force of less than about 300 grams.

Conventional drive means and other conventional devices which may be utilized in conjunction with the apparatus of FIG. 1 are well known and, for purposes of clarity, have not been illustrated in the schematic view of FIG. 1.

In addition to incremental stretching, there are other suitable methods for mechanically stabilizing the necked material. These methods include crimping, and/or creping rollers. Another suitable method includes passing the necked material through the nip of a pair of smooth rollers. The nip pressure and/or roller engagements of such stabilizing rollers are set to provide the desired degree of stabilization to the necked web.

FIG. 8 is a plan view of another suitable embossment pattern for stabilizing the neckable material. The pattern includes a plurality of linear embossments 210 extending continuously across the entire width of the web 205 in a direction generally parallel to the cross-machine direction. The pattern also includes a plurality of linear embossments 212 extending continuously across the entire width of the web 205 at an angle to the cross-machine direction and at an angle to the embossments 210. The web 205 also includes a plurality of linear embossments 214 extending continuously across the entire width of the web 205 at an angle to the cross-machine direction and at an angle to the embossments 210 and 212. The embossments 212 and 214 may extend at any angle to one another and to the embossments 210.

FIG. 9 is a plan view of another embossment pattern for stabilizing the neckable material. The pattern includes a plurality of linear embossments 222 extending continuously across the entire width of the web 220 at an angle to the cross-machine direction. The web 220 also includes a plurality of linear embossments 224 extending continuously across the entire width of the web 220 at an angle to the cross-machine direction and at an angle to the embossments 222. The embossments 222 and 224 are preferably aligned perpendicular to one another. However, other angles between the linear embossments 222 and 224 may also be employed.

The embossment pattern of FIGS. 8 and 9, is provided by feeding the necked material through a nip formed by a pair of patterned compression rollers. Each roller comprises a series of raised surfaces, similar to the teeth 40 and 42 on rollers 34 and 36, respectively. The raised surfaces on each of the rollers are complimentary and engage one another and compress the necked material providing the embossment pattern shown in FIGS. 8 and 9. The compression provided by the patterned compression rollers sets the individual fibers to stabilize the web in its necked condition.

Alternatively, the patterned compression rollers may comprise a pattern roller having a pattern of raised surfaces and an anvil roller having a smooth surface. The raised surfaces on the pattern roller compress the necked material against the anvil roller to provide the embossment pattern shown in FIGS. 8 and 9.

The stabilized extensible necked material may later be joined to an elastic member to form a composite elastic material. Preferably, the stabilized extensible necked material is joined with an elastic member while the elastic member is in a substantially untensioned condition. The stabilized extensible necked material and the elastic member may be joined to one another either intermittently or substantially continuously along at least a portion of their coextensive surfaces while the elastic member is in either a tensioned or an untensioned condition. The stabilized extensible necked material may be joined to an elastic member after having been removed from a roll, such as take-up roll 50, or may be joined to an elastic member after having been subjected to mechanical stabilization.

The elastic member may be made from any suitable elastic material. Generally, any suitable elastomeric fiber forming resins or blends containing the same may be utilized for the nonwoven webs of elastomeric fibers and any suitable elastomeric film forming resins or blends containing the same may be utilized for the elastomeric films of the invention. For example, the elastic member may be an elastomeric film made from block copolymers having the general formula A-B-A' where A and A' are each a thermoplastic polymer endblock which contains a styrenic moiety such as a poly(vinyl arene) and where B is an elastomeric polymer midblock such as a conjugated diene or a lower alkene polymer. Other exemplary elastomeric films which may be used to form the elastic sheet include polyurethane elastomeric materials such as, for example, those available under the trademark ESTANE from B.F. Goodrich & Company, polyamide elastomeric materials such as, for example, those available under the trademark PEBAX from the Rilsan Company, and polyester elastomeric materials such as, for example, those available under the trade designation Hytrel from E. I. DuPont De Nemours & Company.

A polyolefin may also be blended with the elastomeric polymer to improve the processability of the composition. The polyolefin must be one which, when blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, polypropylene copolymers, and butene copolymers.

The elastic member may also be a pressure sensitive elastomeric adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. The elastic sheet may also be a multilayer material that may include two or more individual coherent webs or films. Additionally, the elastomeric sheet may be a multilayer material in which one or more of the layers contain a mixture of elastic and nonelastic fibers or particles.

Other suitable elastomeric materials for use as the elastic member include "live" synthetic or natural rubber including heat shrinkable elastomeric films, formed elastomeric scrim, elastomeric foams, or the like. In an especially preferred embodiment, the elastic member comprises an elastomeric scrim available from Conwed Plastics.

The relation between the original dimensions of the neckable material 22 to its dimensions after tensioning or necking determines the approximate limits of stretch of the composite elastic material. Because the neckable material is able to stretch and return to its necked dimension in directions such as, for example, the machine direction or cross-machine direction, the composite elastic material will be stretchable in generally the same direction as the neckable material 22.

Figure 3:
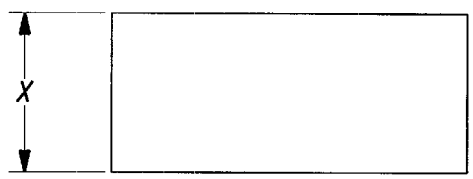
FIG. 3 is a plan view of an exemplary neckable material before tensioning and necking.
Figure 4:
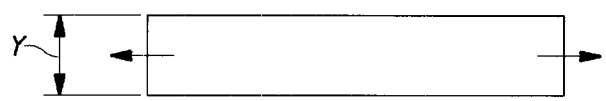
FIG. 4 is a plan view of an exemplary necked material.
Figure 5:
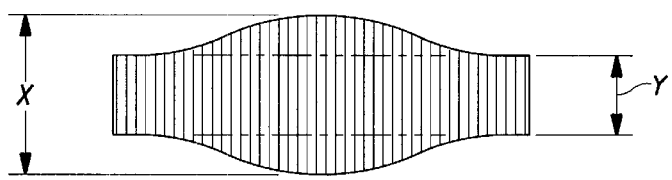
FIG. 5 is a plan view of an exemplary composite elastic material while partially stretched.

For example, with reference to FIGS. 3, 4, and 5, if it is desired to prepare a composite elastic material stretchable to a 150% elongation, a width of neckable material shown schematically and not necessarily to scale in FIG. 3 having a width "X" such as, for example, 250 cm, is tensioned so that it necks down to a width "Y" of about 100 cm. The necked material shown in FIG. 4 is mechanically stabilized to provide a stabilized extensible necked material. The stabilized extensible necked material is then joined to an elastic member having a width of approximately 100 cm and which is at least stretchable to a width of 250 cm. The resulting composite elastic material shown schematically and not necessarily to scale in FIG. 5 has a width "Y" of about 100 cm and is stretchable to at least the original 250 cm width "X" of the neckable material for an elongation of about 150%. As can be seen from the example, the elastic limit of the elastic member needs only be as great as the minimum desired elastic limit of the composite elastic material.

Figure 6:
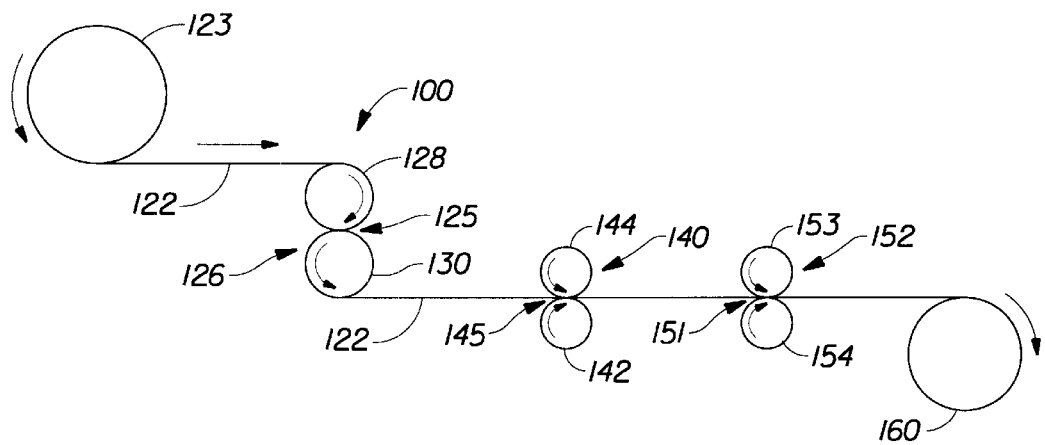
FIG. 6 is a schematic illustration of another exemplary process for forming a necked material of the present invention.

Referring now to FIG. 6, there is schematically illustrated another process 100 for forming a necked material of the present invention.

A neckable material 122 is unwound from a supply roll 123 and travels in the direction indicated by the arrows associated therewith as the supply roll 123 rotates in the direction indicated by the arrows associated therewith. The neckable material 122 passes through the nip 125 of the S-roll arrangement 126 formed by the stack rollers 128 and 130.

The neckable material 122 may be formed by known nonwoven extrusion processes, such as, for example, known meltblowing processes or known spunbonding processes, and passed directly through the nip 125 without first being stored on a supply roll.

The neckable material 122 passes through the nip 125 of the S-roll arrangement 126 in a reverse-S path as indicated by the rotation direction arrows associated with the stack rollers 128 and 130. From the S-roll arrangement 126, the neckable material 122 passes through the pressure nip 145 formed by pressure roller arrangement 140 comprised of pressure rollers 142 and 144. Because the peripheral linear speed of the rollers of the S-roll arrangement 126 is controlled to be less than the peripheral linear speed of the rollers of the pressure roll arrangement 140, the neckable material 122 is tensioned between the S-roll arrangement 126 and the pressure nip of the pressure roll arrangement 140. By adjusting the difference in the speeds of the rollers, the neckable material 122 is tensioned so that it necks a desired amount and is maintained in such a tensioned, necked condition. From the pressure roller arrangement 140 the necked material 122 passes through the nip 151 formed by the mechanical stabilization arrangement 152 comprised of incremental stretching rollers 153 and 154. Because the peripheral linear speed of the rollers of the pressure roll arrangement 140 is controlled to be less than or equal to the peripheral linear speed of the rollers of the mechanical stabilization arrangement 152, the material is maintained in its tensioned and/or necked condition between the pressure roll arrangement 140 and the mechanical stabilization arrangement 152. After leaving mechanical stabilization arrangement 152 the stabilized necked material 122 is wound up on take-up roll 160.

Conventional drive means and other conventional devices which may be utilized in conjunction with the apparatus of FIG. 6 are well known and, for purposes of clarity, have not been illustrated in the schematic view of FIG. 6.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A stabilized extensible necked nonwoven web comprising a neckable material and having a pattern of stabilizing embossments as a result of being subjected to incremental stretching while the nonwoven web is in a necked condition wherein said stretching permanently stretches said material to form said embossments said embossments running across the entire width of said nonwoven web, said nonwoven web exhibiting an extensibility of at least 100 percent at a force of no more than 100 grams and where the pattern of stabilizing embossments consists of a pattern of continuous compressed zones throughout the entire web.

* * * * *